United States Patent [19]

Takahashi et al.

[11] Patent Number: 4,891,081
[45] Date of Patent: Jan. 2, 1990

[54] METHOD FOR PRODUCING A FOAMED RESIN MOLDING

[75] Inventors: Shuichi Takahashi, Kani; Kiyomi Nishida, Inuyama, both of Japan

[73] Assignee: Tokai Chemical Industries, Ltd., Komaki, Japan

[21] Appl. No.: 935,856

[22] Filed: Nov. 28, 1986

[30] Foreign Application Priority Data

| Dec. 4, 1985 | [JP] | Japan | 60-273797 |
| Dec. 28, 1985 | [JP] | Japan | 60-299559 |
| Dec. 28, 1985 | [JP] | Japan | 60-299560 |
| Jan. 17, 1986 | [JP] | Japan | 61-008442 |
| Feb. 18, 1986 | [JP] | Japan | 61-034469 |
| Feb. 24, 1986 | [JP] | Japan | 61-038920 |
| Aug. 8, 1986 | [JP] | Japan | 61-187059 |
| Aug. 8, 1986 | [JP] | Japan | 61-187060 |

[51] Int. Cl.$^4$ ............................................. B32B 5/18
[52] U.S. Cl. ........................................ 156/78; 264/45.2; 264/46.4; 264/46.6; 264/46.7; 428/318.8; 428/319.3
[58] Field of Search ............... 156/78; 264/46.4, 46.6, 264/45.2, 46.7; 297/DIG. 1; 428/319.3, 318.8

[56] References Cited

U.S. PATENT DOCUMENTS

| 1,957,732 | 5/1934 | Rowe | 156/87 |
| 2,248,413 | 7/1941 | Rathbun | 297/DIG. 1 X |
| 2,802,766 | 8/1957 | Leverenz | 297/DIG. 1 X |
| 2,976,577 | 3/1961 | Gould . | |
| 3,258,511 | 6/1966 | McGregor, Jr. | 264/46.4 |
| 3,875,275 | 4/1975 | Lemelson | 264/46.7 X |
| 4,031,176 | 6/1977 | Molbert | 264/45.2 |
| 4,138,283 | 2/1979 | Hanusa | 156/87 X |
| 4,323,410 | 4/1982 | Urai | 156/228 |
| 4,379,103 | 4/1983 | Doerfling | 428/318.8 X |
| 4,738,809 | 4/1988 | Storch | 264/46.7 X |

FOREIGN PATENT DOCUMENTS

| 53-28684 | 3/1978 | Japan | 156/78 |
| 59-20635 | 2/1984 | Japan | 264/46.6 |
| 59-83632 | 5/1984 | Japan | 264/46.7 |

OTHER PUBLICATIONS

"The Blowing of Plastics", Modern Plastics, Oct. 1943, pp. 96–97.

Primary Examiner—Michael W. Ball
Assistant Examiner—Jeff H. Aftergut
Attorney, Agent, or Firm—Berman, Aisenberg & Platt

[57] ABSTRACT

A method and a foamed resin molding in which a skin layer is formed by pressing an expansible film against and into conformity with cavity walls of a mold or a bag-like cover member by foaming pressure of a foamable resin and a foamed resin body molded concurrently and integrally under the skin layer, which facilitate the easy parting of the moldings from the mold without parting agent.

12 Claims, 12 Drawing Sheets

METHOD FOR PRODUCING A FOAMED RESIN MOLDING

BACKGROUND OF THE INVENTION

1. Field of the invention

This invention relates to a molding of a foamed resin such as foamed polyurethane resin or the like, and a method for producing such moldings, which are particularly useful as head rests, arm rests, sunvisors, crash pads, bumpers of motor vehicles.

2. Description of the Prior Art

Moldings of a foamed resin such as foamed polyurethane resin are generally used as arm rests, crash pads and bumpers of motor vehicles, and the outer surfaces of the foamed resin moldings are generally covered with cloth or coated with a paint which gives a better appearance.

As a method for producing such molding, it is the usual practice to charge a foamable resin material into a mold which is applied with a parting agent on the inner surfaces thereof. In this connection, it is also known to overlay a film-like cover member on the mold cavity walls before charging a foamable resin to obtain a molding with a cover member integrally bonded to the surfaces of the molded body. Further, in the production of crash pads, an insert of a hard material is generally placed on one mold surface before molding for the purpose of shape retention or securing attachment to a vehicle body.

On the other hand, when molding a foamable resin, a parting agent of a fluorine-, wax- or silicontype is usually applied on the cavity walls for protection of the mold and at the same time for ensuring release of the molding. As a result, mold maintenance including periodical washing of the mold is required to remove the parting agent which would otherwise accumulate in the mold.

In addition, the parting agent which remains on the surfaces of the molding deteriorates the wettability with paint, inviting repellation of paint or irregularities in coating. Even in a case where a molding is free of these drawbacks, exudation of the parting agent on the coated surfaces often takes place with time, impairing the appearance and tactile impression of the products.

When piling the surfaces of a molding, in most cases there arise similar problems such as low wettability and repellation of adhesive, causing irregularities in thickness of the the coating. In such a case, the pile fibers are bonded defectively in those portions where the adhesive is repelled. On the contrary, in those portions where the adhesive is applied in a greater thickness, the adhesive tends to exude on the surface by capillary action along the bonded pile fibers, further adhering pile fibers there in a greater thickness than in other portion.

Therefore, the conventional process includes a washing step for removing the parting agent prior to the paint coating or adhesive applying stage. Nevertheless, it is regarded as almost impossible to eliminate the above-mentioned problems due to the difficulty of removing the parting agent completely from a molding of complicated shape.

There has been another problem that a parting line which is formed on a molding by the split portion of the mold becomes conspicuous after paint coating or piling in such a degree as to be detrimental to the appearance of the product.

There are also known molding methods without using a parting agent, for example, a method of charging a resin after overlaying a film-like cover member on mold cavity walls, a method of coating fluororesin or other releasing agent on cavity walls, and a method of plating mold cavity walls with chromium. However, in the case of the method of overlaying a film-like cover member on mold surfaces, a difficulty is encountered in laying film along cavity walls of complicated shape, taking time for this job. In case of the method of plating or coating a releasing material on mold cavity walls, the effect does not last long in spite of the high operational cost, failing to completely eliminate the use of a parting agent.

Heretofore, head rests and sunvisors are produced by molding a foamed resin body with cushioning property from a foamable, resin-like foamable urethane and then covering the foamed resin body in a bag-like cover member of cloth or the like. The bag-like cover member is generally formed into a shape complementary to the shape of the foamed resin body by sewing and fitted on the latter by heat-softening the cover member with steam in a case where the foamed resin body is of a simple shape. When the foamed resin body is of a complicated shape, however, it has been difficult to fit the bag-like cover member on the foamed resin body once and for all, necessitating to divide the cover member into a number of segments and to patch the respective segments after fitting on the foamed resin body.

Thus, the above-mentioned conventional method involves a large number of steps for fitting the bag-like cover member. Since the bag-like cover member is produced separately from the foamed resin body, dimensional errors in the manufacturing process often lead to the problem of wrinkling or slackening of the cover member after fitting same on the foamed resin body, which impairs the appearance of the final product.

In order to solve these problems, there has been made an attempt to foam and mold a foamable resin within a bag-like cover member. However, this method has problems such as leakage of the resin through the openings between the stitches in seamed portions of the cover member and impregnation and solidification of the resin into the stitches stiffening the seamed portions. Therefore, the fabrication of the bag-like cover member requires additional steps for stopping the openings in the seam stitches or forming seams by double sewing. In a case where the bag-like cover member is made of woven cloth or the like, there is a problem that the resin is likely to exude through the openings in the woven fabric itself.

Further, the inserts in the conventional foamed resin moldings are simply held in contact with the foamed resin of the moldings. Namely, since an insert which has low adhesion to the foamed resin body is easily detached from the foamed resin body, it has been necessary to select an insert from limited kinds of materials which show high adhesion to the foamed resin. In some cases, an adhesive is used for making up for the inferior adhesion to the foamed resin body, but this is disadvantageous in view of the increase in the number of steps and in the raw material cost.

SUMMARY OF THE INVENTION

With the foregoing problems in view, the present invention has as its object the provision of a method for producing a foamed resin molding with use of no or almost no parting agent to permit coating and piling operations in a secure and facilitated manner.

It is another object of the present invention to provide a foamed resin molding having a bag-like cover member fitted thereon, free of leakage and impregnation of the resin through and into stitches in seamed portions, and a method for producing such a foamed resin molding.

It is a further object of the invention to provide a foamed resin molding which ensures secure adhesion of an insert to the foamed resin body no matter whether the insert material is arbitrarily selected, and a method for producing such a foamed resin molding.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1 to 5 are figures according to Example 1 of the invention, in which

FIG. 1 is a view of a head rest formed according to the present invention,

FIG. 2 is a perspective view of a mold with a bag-like expansible film placed therein to serve as a facing material, FIG. 3 is a sectional view taken on line A—A of FIG. 2, FIG. 4 is an explanatory sectional view of the mold in a foaming and molding stage, and FIG. 5 is a schematic sectional view of the resulting head rest;

FIGS. 9 to 12 are figures explaining the method concerning Example 3 of the invention, in which FIG. 9 is a schematic sectional view of a mold with a thermoplastic urethane film (an expansible film) placed therein, FIG. 10 is a schematic sectional view of the mold of FIG. 9 in an air evacuated state subsequent to mold clamping, FIG. 11 is a schematic sectional view of the mold of FIG. 9 in a foaming stage, and FIG. 12 is a schematic sectional view of the resulting crash pad;

FIGS. 13 to 16 are figures according to Example 4 of the invention, in which

FIG. 13 is a schematic sectional view of a lower mold with a film-like cover member placed thereon, FIG. 14 is a schematic sectional view of the mold of FIG. 13 with an expansible film placed on the film-like cover member, FIG. 15 is a schematic sectional view of the mold being air evacuated subsequent to mold clamping, and FIG. 16 is a schematic sectional view of the mold in a foaming stage;

FIGS. 18 to FIG. 21 are figures according to Example 6 of the invention, in which FIG. 18 is a fragmentary sectional view of a mold in a stage immediately after completion of molding with embracing projections, FIG. 19 is a fragmentary sectional view of a molding showing insert and embracing projection of modified form, FIG. 20 is a fragmentary sectional view of a molding showing insert and embracing projection of another modified form, and FIG. 21 is a perspective view of another modification of the insert;

FIGS. 22 to 26 are views according to Example 7 of the invention, in which

FIG. 22 is a fragmentary sectional view of a mold in a stage immediately after completion of molding with locking projections, FIG. 23 is a fragmentary sectional view of a molding showing a modification of the locking projection, FIG. 24 is a fragmentary sectional view of a molding showing another modification of the locking projection, FIG. 25 is a fragmentary sectional view of a molding showing still another modification of the locking projection, and FIG. 26 is a fragmentary sectional view of a molding showing still further modification of the locking projection;

FIGS. 27 and 28 are figures according to Example 8 of the invention, in which

FIG. 27 is a schematic sectional view of a mold with a bag-like cover member and a bag-like expansible film placed therein, and FIG. 28 is a schematic sectional view of the mold of FIG. 27 in a stage immediately after completion of molding.

DETAILED DESCRIPTION OF PREFERRED EMBODIMENTS

Figure 3:
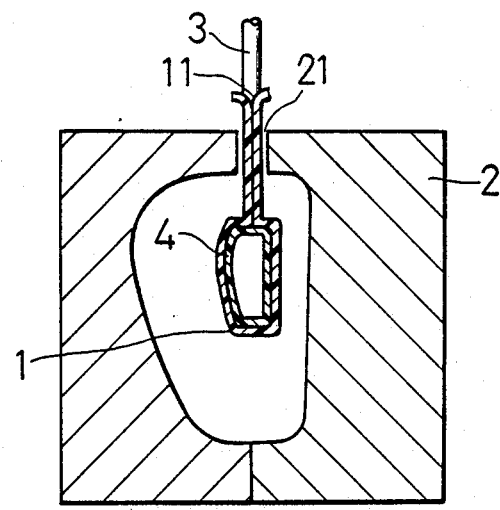
Figure 4:
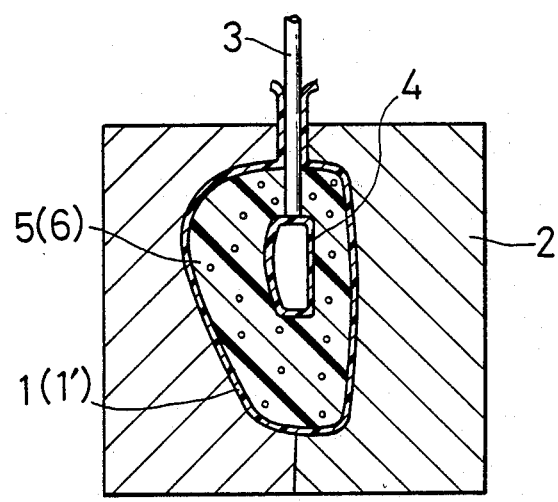
Figure 5:
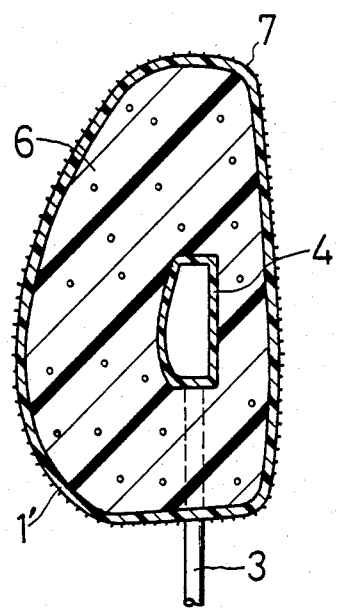

As shown in FIGS. 3 to 5, the foamed resin molding covered with a skin layer according to the invention is characterized by the provision of a skin layer 1' of an expansible film 1 formed into the shape at least a part of the mold cavities by the foaming pressure in the foaming stage of a foamable resin, and a foamed resin body 6 integrally molded under the skin layer.

The skin layer 1' shaped into conformity with the mold cavities is formed by pressing the expansible film 1 against the mold cavity walls.

The term "expansible film" means a thin stretchable film, for example, a film in the form of a flat sheet or a bag which can be expanded by the foaming pressure. For the expansible film, there can be employed, for example, a butadiene base film or a thermoplastic polyurethane film with high tensile stretchability. The thickness and tensile stretchability of the expansible film are selected depending upon the shape of the foamed resin body to be produced, but should at least be large enough for preventing rupturing of the film by the shaping force imposed by the expansion of the foamable resin. Especially, the tensile stretchability is preferred to be greater than 100%.

The expansible film can be tinted with various colors by addition of a pigment or dye, but it is preferred to have the same color as the foamed resin body.

The skin layer can be formed on at least a part of the surfaces of the foamed resin body, or on both of the one and other side of the foamed resin body, or on the entire surfaces of the foamed resin body.

The above-mentioned foamed resin body is integrally and concurrently formed under the skin layer, and constituted, for example, by polyurethane, polyvinyl chloride, polystyrene, polyethylene, polypropylene, ABS resin or phenolic resin, urea resin, epoxy resin or silicon resin or the like. Among these foamable resins, for foamed resin body, it is preferred to employ polyurethane which is in liquid form before foaming The foamable resin is preferred to be of the same kind as the expansible film. For example when the expansible film consists of a thermoplastic polyurethane film, it is preferred to use polyurethane as the foamable resin to ensure secure adhesion thereto of the skin layer, precluding the trouble of skin peeling off.

The foamed resin body is formed into various shapes depending upon the purpose of use.

The foamed resin molding according to the invention may have an insert of an iron or resin plate in part of the formed resin body. A molding with an embossed skin layer can be obtained by the use of a mold with an embossed cavity wall.

The foamed resin molding covered with a skin layer according to the present invention has a feature that the skin layer is formed into the shape of the cavity wall of the mold by the foaming pressure of the foamable resin which presses the expansible film against the cavity wall.

Accordingly, a skin layer of a shape complementary to the shape of the cavity wall can be formed accurately and securely as the foamed resin body is molded. It follows that the resulting foamed resin molding is satisfactory in molding accuracy as well as in appearance, and a molding with a skin layer of complicated shape can be produced.

Since the foamed resin molding is covered under a skin layer, it can be molded without using a parting agent which might lead to deterioration in surface quality and coating defects.

The kind, thickness and color of the expansible film which constitutes the skin layer of the foamed resin molding of the invention may be changed arbitrarily to obtain moldings with various skin layers of different properties.

The foamed resin molding is characterized by the skin layer and the foamed resin body molded concurrently and integrally under the skin layer. Therefore, the foamed resin body shows excellent adhesion to the skin layer, securely preventing peeling off of the skin layer.

Figure 18:
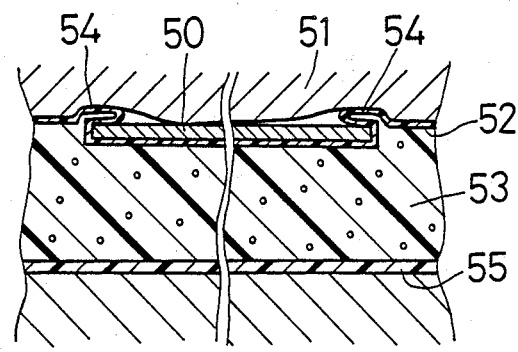

As shown in FIG. 18, the foamed resin molding with an insert according to the present invention comprises an insert 50, a skin layer 52 formed by pressing the expansible film against one side of the insert by foaming pressure and having enfolding portions extending onto the other side of the insert 50, and a foamed resin body 53 molded and solidified integrally and concurrently with a skin layer 52 and filling the enfolding portions to form insert holding or embracing projections 54.

The foamed resin molding with an insert and a concurrent skin layer is characterized in that the insert 50 is mechanically coupled with the foamed resin body 53 with the skin layer 52 through the enfolding portions and the embracing projections 54.

The insert is selected from metals, resins or other suitable materials and has no particular restrictions with respect to its shape. As will be described hereinafter, it is preferable to provide notched grooves 58 shown in FIG. 21, extending from one side to the other side in peripheral edge portions of the insert, or to shape the insert to a tapered sectional area 56 converging toward peripheral edge portions or a stepped sectional area 57 shown in FIGS. 19 and 20, respectively. By so doing, a clearance is formed between the mold and the marginal edge portions of the insert, which facilitate formation of the abovementioned enfolding portions and embracing projections which hold the insert to the foamed resin body.

A feature of the invention resides in that the molding has a skin layer in contact with one side of an insert. This skin layer is formed by pressing the afore-mentioned expansible film against the cavity wall. The skin layer exists between the insert and the foamed resin body, and covers the surface of the foamed resin body opposing the insert. Namely, in the molding stage, the skin layer prevents contact of the foamed resin body with the mold cavity wall on which the insert is placed, so that there is no need for applying a parting agent on the cavity wall.

Another feature of the invention resides in that the insert and foamed resin body are mechanically coupled with each other, through the skin layer.

The skin layer is provided with enfolding portions extending from one to the other side of the insert. These enfolding portions may be formed either only on part of peripheral edge portions of the insert or on its entire circumference. In the former case, the enfolding portions are preferred to be formed in opposing portions across an insert to hold same in a secure manner.

The enfolding portions are filled with the foamed resin body and form embracing projections which are turned around the peripheral edge portions of the insert to extend onto the outer side of the insert from its inner side which faces the foamed resin body. Accordingly, the insert is securely gripped in position by the embracing projections which mechanically couples the insert with the foamed resin body through the shaped skin layer.

These embracing projections are formed by expansion of the foamed resin body, for instance, by the foamable resin which intrudes through the clearance between the insert 50 and mold 51 as shown in FIG. 18. In this case, the embracing projectings 54 in the clearance form a bank of substantially L-shape in section. In this connection, it is preferred that the insert has a tapered or stepped sectional area 56 and 57 in the peripheral edge portions as shown particularly in FIGS. 19 and 20 to facilitate the formation of the embracing projections 54' and to ensure secure coupling.

Figure 21:
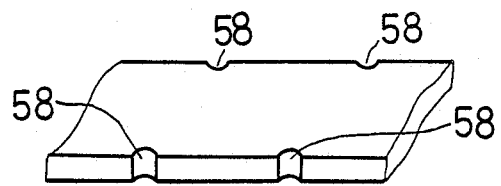

It is also preferred that the insert is provided with notched grooves 58 extending from one side to the other side in its peripheral edge portions as shown in FIG. 21. In this instance, clearances are imperatively formed between the mold and insert, and embracing projections can be formed more easily. Preferably, the insert is provided with a plural number of such notched grooves, desirably, in opposite positions across the body of the insert.

As shown in FIG. 18, the foamed resin body is preferred to have a film-like cover member 55 also on the surface opposite to the surface with the skin layer 52 to permit to carry out the molding operation without using a parting agent to preclude the problems or drawbacks such as impairment of the surface condition which might be caused by the parting agent. Though polyvinylchloride is generally used for the film-like cover member, it is also possible to use the same expansible film as the film-like cover member.

In order to produce the foamed resin molding with an insert according to the present invention, for example, an expansible film is laid on a mold half A of a split mold and an insert is placed on the other mold half B, followed by clamping of the mold. Then, a foamable resin is charged into a space between the mold A and the expansible film and foamed. As the resin is foamed, the expansible film is expanded by the foaming pressure and pressed against the insert, entering the clearances between the insert and the mold B.

Consequently, the skin layer which is formed by expansion of the expansible film is tucked onto the inner periphery of the clearance forming the enfolding portions and filled with the foamed resin to provide the embracing projections after solidification.

With the above-described foamed resin molding with an insert according to the present invention, the insert is mechanically coupled with the foamed resin body by the enfolding portions and embracing projections through the skin layer. Accordingly, it is possible to select the insert material arbitrarily or with a greater degree of freedom, disregarding the adhesion of the material to the skin layer.

The mold cavity on which the insert is placed is prevented from directly contacting the foamed resin body by the skin layer in the molding operation. Therefore, there is no necessity for applying a lubricant or parting agent at least on the mold cavity wall on which the insert is placed, and this contributes to reduce the number of steps as compared with the conventional processes. In addition, the surfaces which bear the skin layer is exempted from such troubles as impairment of surface quality by the parting agent and coating defects.

Also in a case where a film-like cover member is laid on the cavity wall of one of the split mold halves to foam and mold a foamable resin between the skin layer 65 and the film-like cover member 55, the molding operation can be carried out without using a parting agent to preclude the above-mentioned problems.

In another embodiment, the foamed resin molding with an insert according to the invention includes: an insert having at least one through hole and/or at least one recess broadened from an opening on the inner side of said insert; a skin layer formed by being pressed against the inner side of the insert by foaming pressure and pressed into the opening of the insert to form a forwardly bulged portion; and a foamed resin body foamed and solidified concurrently with shaping of the skin layer, pushing the skin layer against the inner side of the insert and filling the bulged portion to form therein an outwardly locking projection. This molding structure is characterized in that the insert and the foamed resin body covered with a skin layer are mechanically joined by the locking projection of the foamed resin solidified in a bulged form within the opening of the insert.

Figure 22:
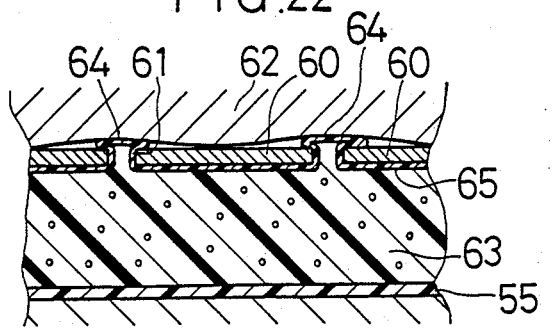

As shown in FIG. 22, the moldings of the invention are composed of an insert 60, a skin layer 65 and a foamed resin body 63. The insert 60 is freely selected from metals, resins or other various materials. This insert 60 is provided with at least one through hole 61 and/or at least one recess which is broadened from an opening on the inner side of the insert. For instance, if the insert is of a plate-like form, a through hole or a recess is bored into one side of the plate toward the other side thereof.

Figure 23:
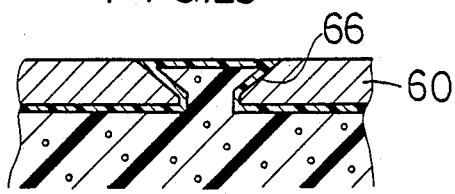

The through hole which extends through from one side to the other side of an insert may be formed in a circular, elliptic or rectangular shape in section. Further, as shown in FIG. 23, the through hole 66 may be formed in a tapered shape with a gradually increasing diameter in a direction away from the one side surface which is abutting contact with the skin layer.

Figure 24:
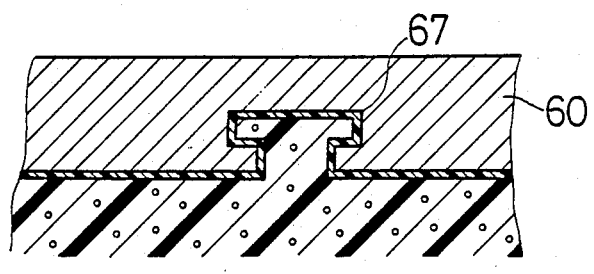
Figure 25:
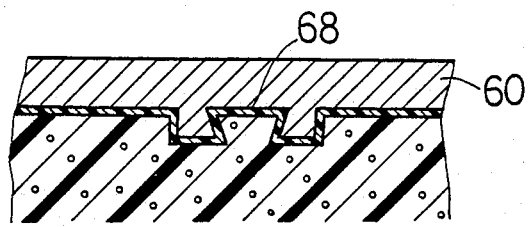
Figure 26:
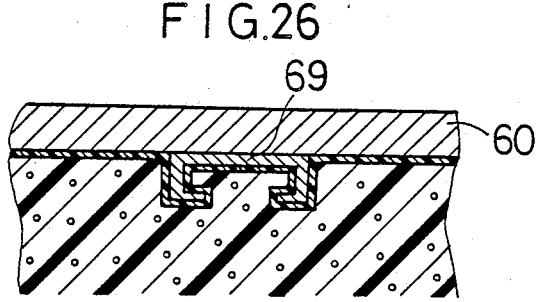

As shown in FIGS. 24 and 25, the recess may be constituted by a groove 67 or 68 which is formed into an insert body 60. Inserts of this sort can be easily produced by extrusion molding. The recess can also be formed by bonding a hollow metal member 69 on a flat plate-like insert body as shown in FIG. 26. These recesses have narrowed openings and broadened toward the inside. This arrangement facilitates the formation of the locking projection.

The skin layer which is forced into the opening of the insert forms at least one bulged portion exposed on the other side of the through hole or confined in the recess. This bulged portion is filled with the foamed resin body to form a locking projection. One of the feature of the invention resides in the provision of the locking projection which mechanically couples the insert with the foamed resin body which is covered with a skin layer.

The shape of the locking projection is decided depending upon the shape of the through hole or recess of the insert. For example, in a case where the insert has a through hole 61 of a constant diameter as shown in FIG. 22, the locking projection 64 is extended through the inner opening of the through hole 61 and laterally bulged after coming out of the outer opening of the through hole 61, and, in a case where the through hole 66 is formed in a tapered shape as in FIG. 23, the locking projection is extended through the inner opening of a smaller diameter and terminated in flush with the outer opening of the through hole 66. In case of an insert with a groove as shown in FIG. 24, the locking projection may be formed in a shape which fills the whole groove 67.

As shown in FIG. 22, the foamed resin body is preferred to have a film-like cover member 55 on the opposite side of the skin layer 65 to permit to carry out the molding operation without using a parting agent which will invite various problems.

In order to produce the above-described foamed resin molding of the invention, for example, the afore-mentioned expansible film is overlaid on the cavity wall of one of the split mold halves and an insert with a through hole or a blind hole is placed on the other mold half in such a manner that the opening in the insert opposes the expansible film, followed by mold clamping. Then, a foamable resin is charged into the mold and foamed in a space between the one mold half and the expansible film, pressing the latter against the insert and forcing same into the opening of the through hole or blind hole by foaming pressure.

The expansible film forms a bulged portion along the inner periphery of the through hole or blind hole in the insert, and the foamed resin which fills the bulged portion form a locking projection after solidification.

In case the insert has a through hole, the expansion of the expansible film is limited at the outer end of the through hole by abutment against the mold cavity wall. In case the through hole has a tapered shape with a gradually increasing diameter, the outer end of the expansible film can be terminated flush with the outer end of the through hole, where the through hole has a constant diameter, the expansible film at the outer end of the hole is laterally bulged out between the insert and mold cavity wall to form a locking projection. Alternatively, a recess with a diameter larger than the through hole may be formed on the cavity wall of the mold half with an insert in communication with the through hole. By so doing, the expansible film which is pushed out of the outer end of the through hole is bulged in the recess to form a substantially T-shaped locking projection which joins the insert more securely to the foamed resin body.

This foamed resin body with an insert according to the invention has the same functions and effects as the foregoing embodiments.

Described hereinafter are some preferred forms of the method for producing the above-described foamed resin moldings according to the invention.

As shown in FIG. 3 a method of the invention is characterized by the steps of interposing an expansible film 1 between the cavity walls of opposing split mold halves, foaming a foamable resin 5 between the expansible film 1 and the cavity wall of one mold half while expanding the film by the foaming pressure to form a foamed resin body 6 with a skin layer 1' in conformity with the shape of the mold cavity shown in FIG. 4, and ejecting the foamed resin molding from the split mold.

As mentioned hereinbefore, a polyurethane film or the like may be used as the expansible film.

In the first positioning step, an expansible film is interposed between the cavity walls of the opposing mold halves.

In the molding step, a foamable resin is foamed between the expansible film and the cavity wall of one mold half. In this instance, it is possible to employ a procedure of placing an expansible film on a mold half which is precharged with a foamable resin and clamping the other mold half thereon, or a procedure of placing an expansible film between the cavity walls of opposing split mold halves and then charging a foamable resin through a port in the mold. In the former case, the foamed resin molding has an improved surface appearance since there is no necessity for providing a charging port in the mold.

As the volume of the foamable resin is increased by foaming, the expansible film is expanded by the foaming pressure. As a result, the expansible film is pressed against and formed into conformity with the shape of the cavity wall of the mold half which is not charged with the foamable resin, producing a foamed resin molding which is integrally covered with a skin layer. For aiding the expansion of the film, a resin injecting pressure or other physical means may be used in addition to the foaming pressure.

The method of the invention is particularly useful for molding a foamed resin molding one side of which is covered with a film-like cover member of a resin or the like formed into the shape of mold cavity. In this instance, the film-like cover member is desirably fitted on the entire molding surface of a split mold half which will be charged with a foamable resin. A foamable resin which is charged into a space between the film-like cover member and the expansible film can be foamed therebetween without contacting the mold cavity walls which otherwise have to be applied with a parting agent.

The film placing step is preferably followed by an air extracting step to remove air which exists between the expansible film and one mold half which is charged with the foamable resin. This precludes the trouble of air trapping between the skin layer and the foamed resin body.

The air extracting step can be carried out by reducing the pressure of the space between the expansible film and one mold cavity wall or by introducing compressed air into the space between the expansible film and the other mold cavity wall. In order to prevent entrance of air during molding operation, it is preferred to maintain the depressurized or pressurized state even in the initial stage of molding operation.

With regard to the foamable resin used in the molding step, any one of the afore-mentioned resins can be used as it is. As foaming means, there may be employed a method of adding a foaming agent such as freon, methylene chloride, butane or the like, or a method of utilizing a reaction product gas, for example, carbon dioxide which is produced by reaction of water with isocyanate.

In a mold releasing step following the molding step, there is obtained a foamed resin body which is covered with a skin layer over the one surface thereof. It is desirable to pierce a needle into the foamed resin body prior to the mold releasing step to discharge excessive gas. In this instance, it is recommended to attach a pressure sensor to the needle and release the mold when the gas pressure drops below a predetermined level.

According to the method of the invention, the expansible film is expanded by the foaming pressure of the foamable resin, pressing the film against the mold cavity wall to shape same into conformity with the shape of the cavity wall. Consequently, there is no need for applying a parting agent at least on the mold cavity wall on which the expansible film is abutted. This facilitates the mold maintenance jobs to a considerable degree as compared with the conventional methods. Besides, the surface which bear the skin layer is completely free from the deterioration of surface quality, coating troubles or other problems resulting from use of a parting agent.

The interposition of the expansible film also ensures hermetical contact of the split mold halves, preventing leaks of resin through the split line. This contributes to the improvement of appearance of the final products and makes it possible to omit the fin removing operation.

Another method of the present invention is characterized by the steps of charging a foamable resin into a bag-like expansible film, foaming the resin in a cavity of a mold while expanding the bag-like expansible film by foaming pressure into a shape conforming with the shape of the mold cavity wall, and ejecting from the mold a foamed resin body covered with a skin layer.

This method is the same as in the foregoing embodiment except that a bag-like expansible film is used as an expansible film.

In this connection, it is possible to use an expansible film 1 which is pre-formed into a bag-like shape, or to place a pair of expansible film sheets 12 on the opposing faces of split mold halves and join marginal edge portions of the film sheets into a bag-like shape by clamping the mold. It is desirable that the bag-like expansible film placed on the mold does not contain air therein to prevent formation of an air layer (air trapping) between the bag-like film and the foamed resin body.

In the molding step, a foamable resin is charged into the bag-like expansible film in the first place. In this instance, it is possible to employ a method of placing in the mold cavity a bag-like expansible film which is pre-charged with the foamable resin, or a method of placing a bag-like expansible film in the mold cavity with the opening of the bag-like expansible film in alignment with a resin charging port 16 of the mold and charging a foamable resin through the opening of the bag-like expansible film. The appearance of the moldings is superior in the former case which does not require to provide a resin charging portion in the mold.

As the volume of the foamable resin is increased by foaming, the bag-like expansible film is expanded by the foaming pressure. As a result, the bag-like expansible film is pressed against and along the mold cavity walls, covering the surfaces of the foamed resin body in intimate contact therewith. The expansion of the bag-like expansible film by the foaming pressure may be aided by a resin charging pressure or other physical means if desired.

According to this foamed resin molding method of the invention, the expansible film of a bag-like shape is expanded by the foaming pressure of the resin, which presses the film against the mold cavity walls to conform with the cavity shape, while filling the skin layer with the foamed resin in fixed state. Namely, the resulting foamed resin molding has the entire surfaces thereof covered with a skin layer. It follows that the resin can be molded without using a parting agent, facilitating the maintenance of the mold. Consequently, it becomes possible to prevent the impairment of the surface quality and coating defects as caused by the use of a parting agent. The expansible film serves to prevent leakage of resin through the split line of the mold, permitting to obtain moldings with no parting line, which are therefore improved in appearance and eliminate the fin removing operation.

The above-described two methods may further include the steps of applying an adhesive to at least one part of the skin layer of the ejected molding, and preferably forming a piled surface by bonding piles to the adhesive-coated surface. The method may also include the step of forming a coated layer on at least one part of the surfaces of moldings by coating a paint thereon. Since the surfaces of moldings are free of parting agent, they can be uniformly coated with an adhesive or paint. The surfaces which are uniformly coated with an adhesive can be piled evenly.

The expansible film is interposed between a mold cavity wall and prevents the foamable resin from entering the split portion of the mold. Therefore, the molding covered with the skin layer has substantially no parting line. If any, it is completely effaced by piling or coating, presenting a good appearance.

Thus, it becomes possible to effect the piling or coating uniformly, and to omit the step of washing off a parting agent as required in the conventional processes, permitting to reduce the number of steps and cost. The absence of a parting line improves the aesthetic grade of appearance and gives a greater freedom in selecting the shape of the products.

In the above-described adhesive coating step following ejection from a mold, the solidified foamed resin molding which is at least partly covered with a skin layer is coated with an adhesive on the surface to be piled. The adhesive is coated on one part of or all over the surface of the skin layer depending upon the purpose of piling.

The adhesive to be used may be of urethane-or acrylic-type or other types which are conventionally used for this purpose. The kind and coating thickness of the adhesive are determined in consideration of the nature of the pile and the kind of the expansible film. The adhesive may be applied by dip-coating, spray-coating, brush-coating or other conventional methods.

In the piling step, a piled surface is formed by bonding pile fibers 7 on the surface which is applied with an adhesive in the preceding step as shown in FIG. 5, before the adhesive dries up. The pile to be used may be of nylon or any other conventional material, and may be of any of the conventional forms including short fiber, a mixture of short and long fiber, twisted or intertwined fiber and the like. The pile may be implanted by a conventional method, for instance, by the electrostatic piling which is a typical piling method and wherein electrically charged pile is attracted by static induction toward a molded body which is grounded, piercing into the adhesive layer on the molded body. Thereafter, the adhesive is dried to obtain a piled surface.

In the coating step subsequent to the solidification and ejection of the foamed resin molding which is at least partly covered with the skin layer, a paint is coated on the surface of the skin layer to be coated. Part of or the entire surface of the skin layer is coated with a paint depending upon the purpose of use. The concept "coating" here includes painting the face of a doll.

The paint may be selected from conventionally available ones including polyurethane resin paint, acrylic lacquer, nitrocellulose lacquer, CAB lacquer, phthalic resin paint, melamine baking finish, epoxy resin paint and the like. There are no particular restrictions with regard to the feeding form of the coating medium, which may be in the form of a solution, dispersion, NAD or powder. It is preferred to select a paint which shows good adhesion to the expansible film. For example, a urethane type paint is desirable for an expansible film of urethane type. In a case where the foamed resin molding is soft or flexible, it is preferred to use a paint with high flexibility like a polyurethane resin paint.

The paint may be coated by a conventional method such as dip-coating, air spraying, electrostatic coating and brush-coating. The thickness of the coating layer is selected arbitrarily depending upon the purpose of use. The coated paint is then dried by a method suitable for the particular kind of paint used, to obtain the final product.

Figure 27:
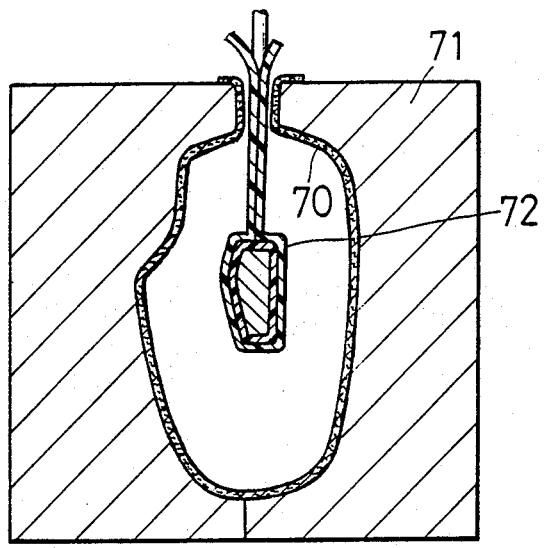
Figure 28:
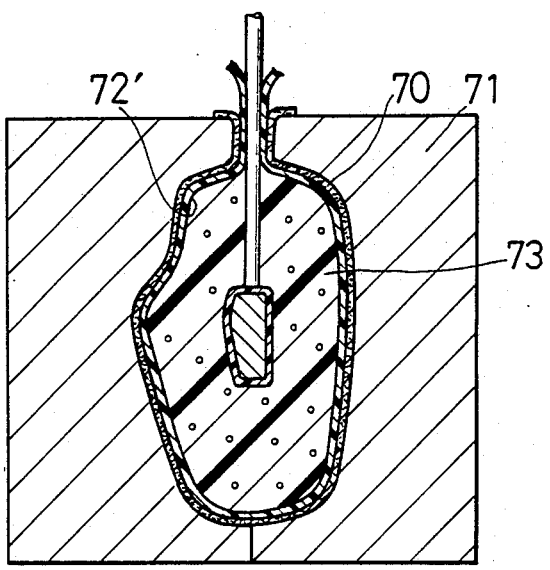

A foamed resin molding method as shown in FIGS. 27 and 28, which constitutes another feature of the invention, comprises the steps of: placing a bag-like expansible film 72 on the inner side of the bag-like cover member 70 and foaming a foamable resin within the bag-like expansible film 72 expanding the bag-like expansible film 72 toward and along the inner peripheral surface of the bag-like cover member 70 to mold a foamed resin molding having a skin layer 72' covered with a bag-like cover member 70.

According to this method of the invention, a bag-like expansible film 72 is placed on the inner side of a bag-like cover member 70 which covers the foamed resin molding like leather skin cover of a head rest. The cover member 70 may be preformed into a predetermined bag-like shape, or may be formed into a bag-like shape by patching up a number of segments or sections. The material for the cover member 70 has no particular restrictions, and may be, for example, a resin, leather or woven cloth.

In the molding step, as the volume of resin is increased by foaming, the expansible film 72 is expanded by the foaming pressure. As a result, the expansible film 72 is pressed against and along the inner peripheral surfaces of the bag-like cover member 70, so that resulting foamed resin body 73 is tightly covered in the skin layer 72' and the bag-like cover member 70.

Figure 29:
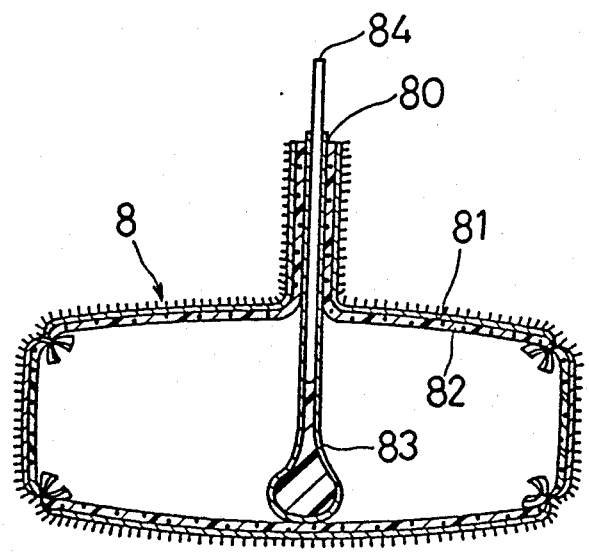
FIG. 29 is a schematic sectional view illustrating resin in a bag-shaped expansible film, according to Example 9.
Figure 30:
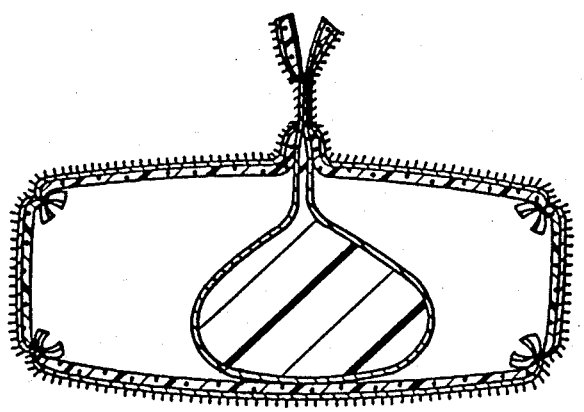
FIG. 30 shows partial expansion of the resin.
Figure 31:
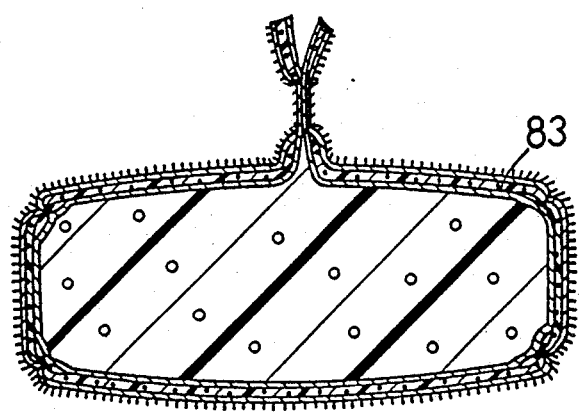
FIG. 31 shows complete expansion of the resin in the bag-shaped cover member, according to Example 9.

If the bag-like cover member 70 has a rigidity which is sufficient for resisting the deforming force of the foaming pressure, the resin can be molded without using a mold as shown in FIGS. 29-31. However, if the cover member 70 consists of a flexible material such as leather or woven cloth, it is desirable to place it in a mold with a cavity of predetermined shape to prevent its deformation.

In the molding step, the expansible film 72 is expanded by the foaming pressure of the resin which presses the film against and into conformity with the shape of the inner surface of the bag-like cover member 70 while the foamed resin which fills the expanded bag-like film 72 (skin layer 72') solidifies. Thus, the bag-like cover member 70 and the skin layer 72' as well as the skin layer 72' and the foamed resin body 73 are held in tight contact with each other.

According to the method of the invention, the number of steps of the process can be reduced considerably since there is no necessity for fitting a cover member after molding. The bag-like cover member 70 is densely filled with the foamed resin body 73, so that it is free from slack and wrinkles. Further, the skin layer 72' prevents leakage of the foamable resin through a seam or through reticulate woven cloth as well as impregnation of the resin into part of a seamed portion. Therefore, the resulting molding has no stiffened portions, and gives a uniform tactile feeling.

Needless to say, the afore-mentioned problems or drawbacks as caused by the use of a parting agent are similarly eliminated.

EXAMPLES

Having generally described this invention, a further understanding can be obtained by reference to certain specific examples which are provided herein for purposes of illustration only and are not intended to be limiting unless otherwise specified.

Figure 1:
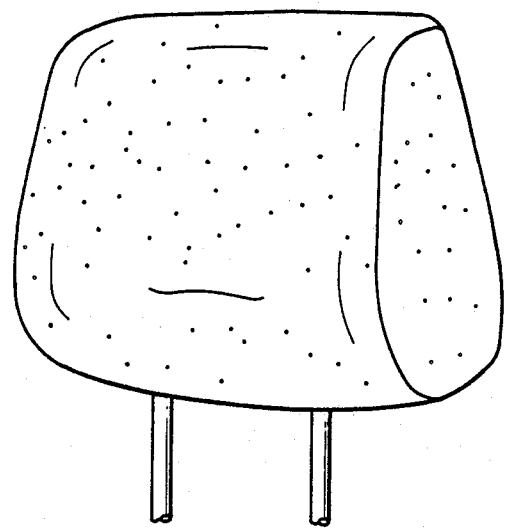

Example 1:

In this example, the invention is applied to the production of a head rest of a foamed resin molding as shown in FIG. 1, for mounting on a seat of a motor vehicle.

Figure 2:
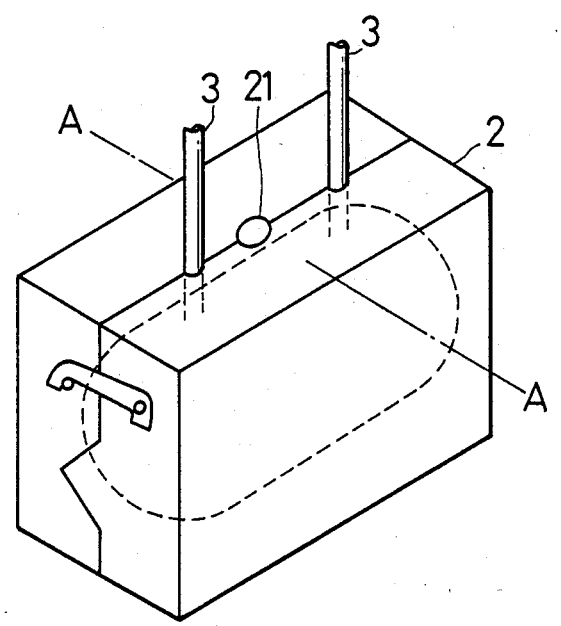

According to FIGS. 3 and 4, a bag-shaped material 1 with an opening 11 at one end is prepared from 30 μm thick expansible thermoplastic urethane film (Mobilon film produced by Nisshin Bohseki Co.). Then, an insert 4 fixed at the top ends of stem 3 is inserted into the bag-shaped material 1 and the air in the bag-shaped material 1 is expelled, placing the bag-shaped material 1 with the insert 4 in the cavity of a mold 2 with the opening 11 in alignment with the resin charging port 21 of a mold 2 as shown in FIGS. 2 and 3. The employed thermoplastic urethane film has, at normal temperature, a tensile strength of 460 kg/cm$^2$ and a tensile stretchability of 550%, and, at 50° C., a tensile strength of 260 kg/cm$^2$ and a tensile stretchability of 740%. These values are measured by the use of a No. 3 dumbbell according to JIS-K-6301.

Next, a foamable polyurethane resin material mixture 5 is charged into the bag-shaped material 1 through its opening 11. A foamable polyurethane resin material mixture 5 contains major components and hardening components in a weight ratio of 65:35, the major components consisting of 80 parts by weight of polyether polyol (Sumifen 3063 produced by Sumitomo-Bayer Urethane Co.), 20 parts by weight of polymer polyol (POP 31-28 produced by Mitsuitouatsu Co.), 4.0 parts by weight of distilled water as a foaming agent, 1.5 parts by weight of triethylenediamine (DABCO 33 LV produced by Nihon Emulsion Co.) and 0.5 parts by weight of a silicone type surfactant (SRX-274C produced by Torey Silicone Co.), and the hardening components having crude diphenylmethanediisocyanate (44V-20 produced by Sumitomo-Bayer Urethane Co.) and toluene diisocyanate (TDI-80 produced by Sumitomo-Bayer Urethane Co.) in a weight ration of 7:3.

The mold 2 is heated to 40° C., foaming the polyurethane resin material mixture 5 into an about 20 times greater volume, while expanding the bag-shaped material 1 as shown also in FIG. 4. At the time of expansion, air in the mold 2 is extracted through a deairing hole which is provided in the mold 2 in a diameter smaller than 0.5 mm though not shown. After completion of foaming, a needle is pierced through the resin charging port to release excess gas, and, after solidification, the mold 2 is opened to eject a molding.

The resulting foamed resin molding has a symmetrical surface relative to the mold cavity and is wholly covered with and integrally adhered to a skin layer 1' of expanded thermoplastic urethane.

In the next place, the entire surface of the skin layer 1' covering the foamed resin body 6 is coated with an aqueous dispersion of acrylic resin of 45 wt% concentration by air spraying an amount of 200 g/m$^2$.

Before the adhesive dries, pile of short fiber of Toray Co. with a length of 1 mm and a fineness of 3 denier is electrostatically deposited on the surface of the skin layer 1', grounding the foamed resin body 6 and applying a voltage of 40 KV to the pile.

As illustrated in FIG. 5, the resulting head rest consists of a foamed resin body 6 of foamed polyurethane, an insert 4 embedded in the foamed resin body 6, a skin layer 1' formed by expansion of the bag-shaped material 1 and integrally bonded on the surface of the foamed resin body 6, and a multitude of pile fibers 7 adhered to the surface of the skin layer 1'. The pile 7 is uniform in density and shows very good adhesion. There are no parting lines.

Figure 6:
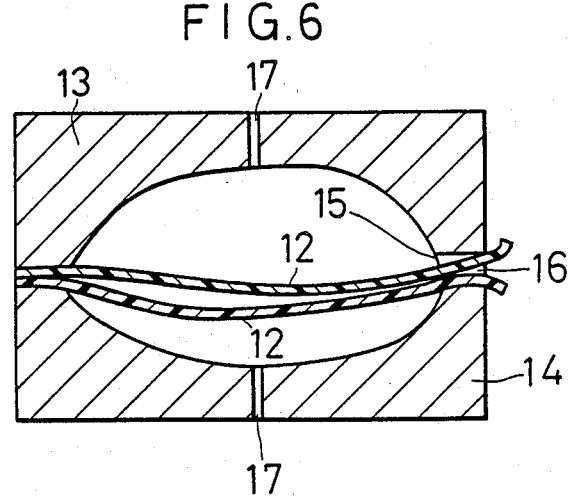
FIG. 6 is a schematic sectional view of a mold with two expansible films placed therein in a bag-like form according to Example 2 of this invention.

Example 2:

Shown in section in FIG. 6 is a mold which is used in this Example 2. Two sheets 12 of an expansible film of thermoplastic urethane similar to the one used in Example 1 are placed on the mold, with marginal portions of the sheets 12 positioned between split surfaces of upper and lower mold halves 13 and 14. The sheets are gripped between the split surfaces by closing the upper and lower molds 13 and 14 to form a bag with its opening 16 at a resin charging port 15.

Figure 7:
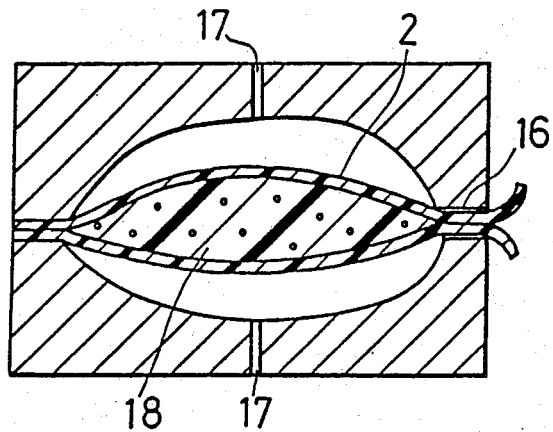
FIG. 7 is a schematic sectional view of a mold of FIG. 6 in which a foamable resin is charged through the opening 16 and its forming process is half way done according to Example 2 of this invention.
Figure 8:
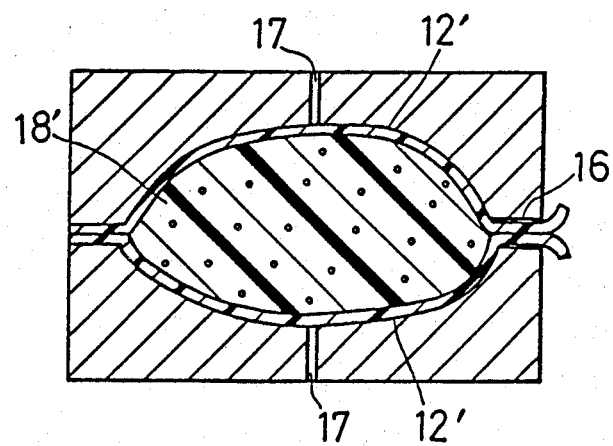
FIG. 8 is also a schematic sectional view of the mold of FIG. 6 and FIG. 7 in which the foaming process of the foamable resin is completed according to Example 2 of this invention.

Nextly, the same foamable resin 18 as in Example 1 is charged through the opening 16 and foamed in the same manner as in Example 1 as shown in FIG. 7 and FIG. 8. The resin 18 is smoothly foamed, expanding the sheets 12, while air in the mold is extracted through a deairing port 17, obtaining a foamed resin molding 18' which is wholly covered with and integrally bonded to a skin layer 12' of the expanded sheets 12. After completion of foaming, a needle is pierced through the resin charging port to release excess gas, and, after solidification of the resin 18, the mold is opened to eject the molding.

Example 3:

In this Example, the invention is applied to the production of a crash pad to be provided in a front portion of the passenger comportment of a motor vehicle.

Figure 9:
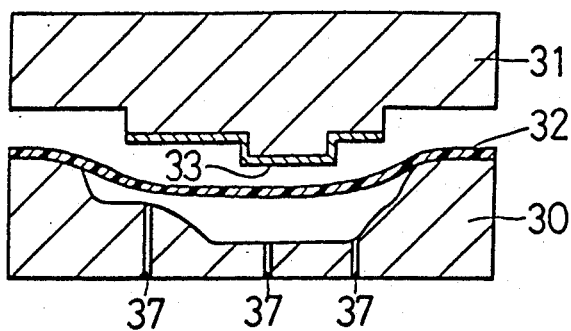

As illustrated in FIG. 9, a 30 μm thick film 32 of the same thermoplastic urethane as in Example 1 (hereinafter referred to simply as "film 32" for brevity) is placed between lower mold 30 and upper mold 31, while placing an insert 33 of a steel plate on the cavity wall of the upper mold 31. A mixture of wax and silicon as a parting agent is applied on the cavity wall of the upper mold 31, but not at all on the cavity wall of the lower mold 30.

Figure 10:
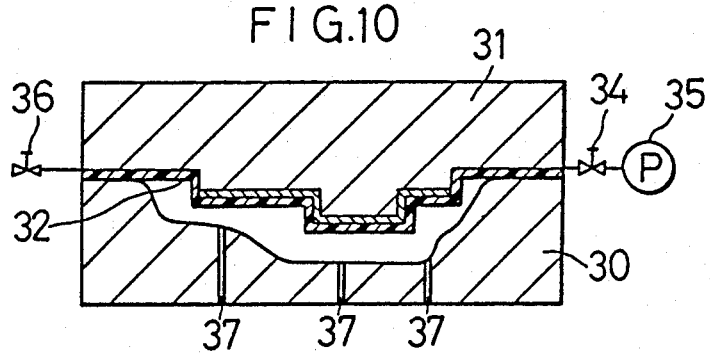

After clamping the upper mold 31 on the lower mold 30, air is extracted from a space between the upper mold 31 and the film 32 by a vacuum pump 35 through a valve 34, and, as shown in FIG. 10, the valve 34 is closed, with the film 32 in intimate contact with the cavity wall of the upper mold 31.

In the next place, a valve 36 is opened to charge the foamable polyurethane resin material into the space between the cavity wall of the upper mold 31 and the film 32. The foamable polyurethane resin mixture contains major components and hardening components in a weight ratio of 67:33, the major components consisting of 100 parts by weight of polyether polyol (Sumifen 3900 produced by Sumitomo-Bayer Urethane Co.), 2.0 parts by weight of distilled water as a foaming agent, 1.0 part by weight of triethylenediamine (DABCO 33 LV produced by Nihon Emulsion Co.) and 5.0 parts by weight of triethanolamine, and the hardening components consisting of crude diphenylmethane diisocyanate (44V-20 produced by Sumitomo-Bayer Urethane Co.).

Figure 11:
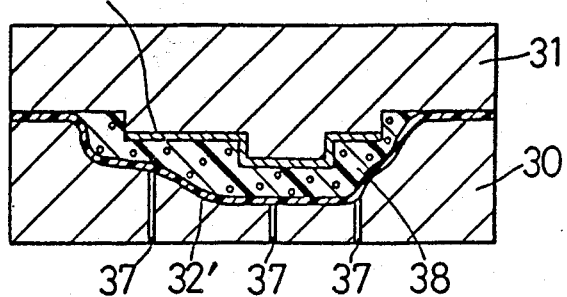

Thereafter, the lower and upper molds 30 and 31 are heated to 40° C., foaming the polyurethane resin mixture to an about 9 times greater volume, expanding the film 32 by the foaming pressure against the cavity wall of the lower mold 30 as shown in FIG. 11. In this state, the foamed resin is solidified and integrally bonds to the skin layer 32' of the expanded film 32 and insert 33.

At the time of film expansion, air between the lower mold 30 and film 32 is extracted to the outside through deairing ports 37 which are formed in the lower mold 30 in a diameter smaller than 0.5 mm. After solidification following the foaming, the mold is opened to eject a foamed resin body 38 covered with the skin layer 32'. The foamed resin body 38 with the skin layer 32' is easily released from the lower mold 30 without using a parting agent.

Next, the entire surface of the skin layer 32' covering the foamed resin body 38 is uniformly coated by air spraying with a paint prepared by adjusting a commercially available acryl-urethane resin paint with a specified thinner coating the paint in a thickness of 25 μm. The coating film layer is dried at 60° C. for 1 hour.

Figure 12:
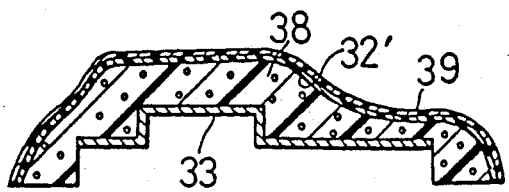

As illustrated in FIG. 12, the resulting crash pad consists of a foamed resin body 38 of foamed polyurethane, insert 33 integrally joined to one surface of the foamed resin body 38, a skin layer 32' of expanded polyurethane film 32 integrally bonded to the surface of the foamed resin body 38, and a coating film layer 39 coated to the surface of the skin layer 32'. The coating film layer 39 has an improved appearance with uniform layer thickness and good adhesiveness to the skin layer 32'. The coating film layer 39 also has enough flexibility to bear with the elastic deformation of the foamed resin body 38.

Figure 13:
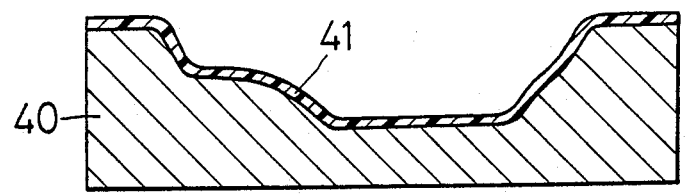
Figure 14:
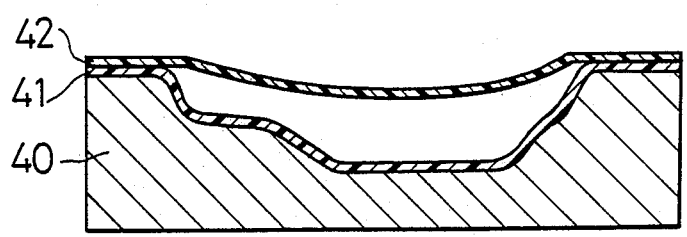

Example 4:

As shown in FIG. 13, a pre-shaped film-like cover member 41 consisting of a polyvinylchloride sheet is fitted on the cavity wall of the lower mold 40 of a split mold. In the next place, as shown in FIG. 14, the same thermoplastic urethane film 42 as in Example 3 is placed on the cover member 41.

An insert 44 of a steel plate is placed on the cavity wall of the upper mold 43. An adhesive is applied beforehand on the surface of the insert 44 which opposes the lower mold 40.

Figure 15:
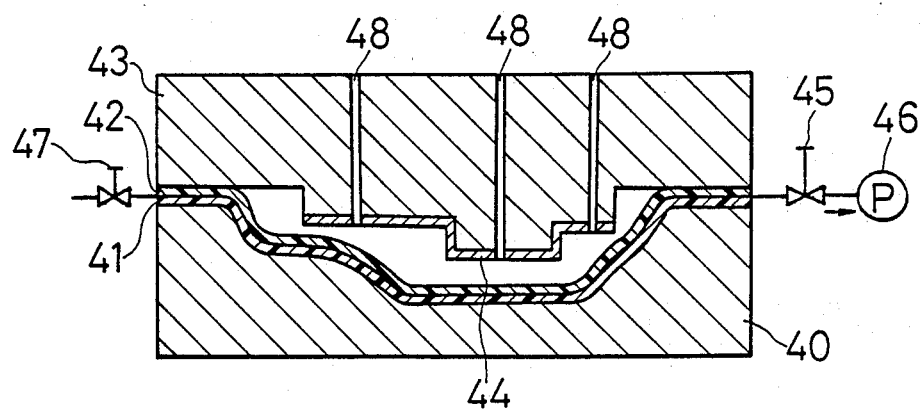

Then, the upper mold 43 is placed on and clamped to the lower mold 40, and air is extracted by a vacuum pump 46 from the space between the cover member 41 and the film 42 through a valve 45. The valve 45 is closed after bringing the cover member 41 and the film 42 into intimate contact with each other as illustrated in FIG. 15.

Thereafter, a valve 47 is opened to charge the same foamable polyurethane resin mixture as in Example 3, through the space between the cover member 41 and the film 42.

Figure 16:
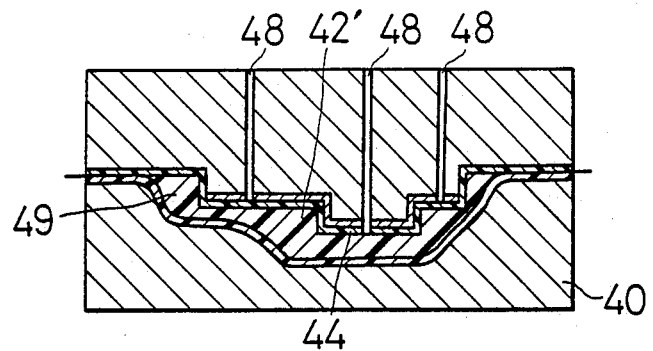

The lower and upper molds 40 and 43 are heated to 40° C., foaming the polyurethane resin mixture to about 9 times greater volume, expanding the film 42 by the foaming pressure against and into conformity with the cavity wall of the upper mold 43 as shown in FIG. 16 while bonding the film 42 fixedly to the insert 44 by the adhesive.

At the time of expansion, air between the cavity wall of the upper mold 43 and the film 42 is discharged to the outside through deairing holes 48 which are provided in the upper mold 43 in a diameter smaller than 0.5 mm. After completion of foaming, the mold is opened to eject the molding.

The molding thus obtained has a surface which is shaped symmetrically relative to the mold cavity, with the skin layer 42' of the expanded film 42 perfectly in conformity with the cavity wall of the upper mold 43. The foamed resin body 49 is wholly covered with and integrally bonded to the cover member 41 of the polyvinyl chloride sheet and the skin layer 42'. Therefore, it is easily released from the mold without using a parting agent, and there are no resin leaks from the split line.

Example 5:

Example 4 is repeated except a pressurizing means which is used for extracting air from between the thermoplastic urethane film 42 and the film-like cover member 41.

Figure 17:
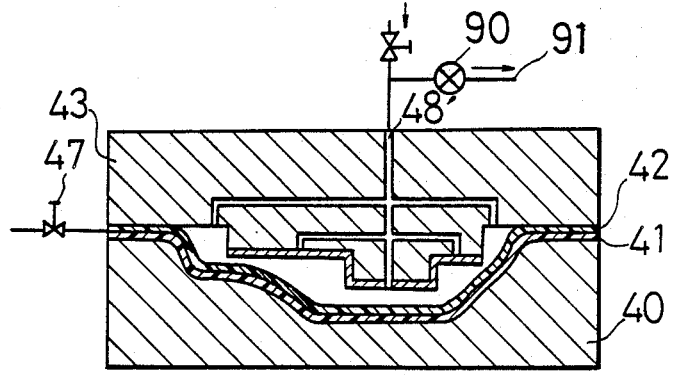
FIG. 17 is a schematic sectional view of a mold according to Example 5 of the invention in a stage of air extraction by pressurization.

Namely, as shown particularly in FIG. 17, after placing a thermoplastic urethane film 42 on a cover member 41 on the lower mold 40, the mold is clamped while feeding compressed air of 0.3 kg/cm² between the cavity wall of the upper mold 43 and the film 42 through a pressurizing hole 48' provided in the upper mold 43. As a result, the film 42 and the cover member 41 are held in intimate contact with each other. The feed of compressed air is cut off, holding the mold in the pressurized state.

Thereafter, a valve 47 is opened to charge the same foamable polyurethane resin mixture as in Example 4 for foaming and molding same in a similar manner.

Simultaneously with the charging of the polyurethane resin mixture, a pressure regulator valve 90 in a compressed air feed passage is opened to discharge the compressed air from the mold. As the film 42 is expanded by the foaming pressure, air between the cavity wall of the upper mold 43 and the film 42 is discharged through a discharge port 91 to bring the film 42 securely into conformity with the cavity wall of the upper mold 43.

Example 6

Example 4 is repeated except that a clearance is provided between an insert and a cavity wall surface on which the insert is abutted, and the insert is interlocked with a skin layer mechanically without resorting to an adhesive.

In this Example, a foamable polyurethane resin mixture is foamed to an about 9 times greater volume, expanding a thermoplastic urethane film by the foaming pressure to form a skin layer 52 conforming with the contours of the insert 50 and cavity wall of an upper mold 51 as shown in FIG. 18. The skin layer 52 tucks into the clearance between the insert 50 and upper mold 51 insert 50 is enfolded and solidified together with the foamed resin body 53 to form embracing projections 54.

Figure 19:
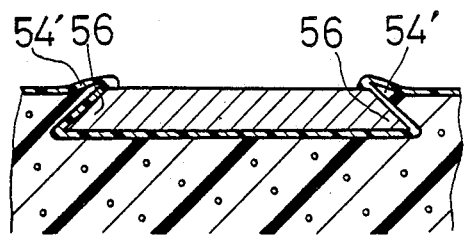
Figure 20:
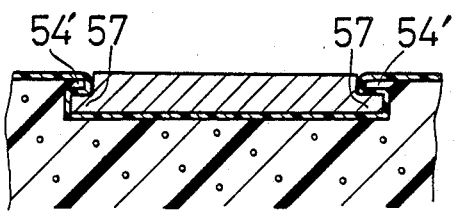

The molding of this Example has the insert 50 mechanically joined to the molding by the embracing projections 54 through the skin layer 52. Therefore, there is no need for employing an adhesive.

Where the insert peripheral portions 56 of tapered shape in section to have an outwardly reduced thickness as shown in FIG. 19 or peripheral portions 57 of stepped shape in section as shown in FIG. 29 or where the insert is provided with notched grooves 58 as shown in FIG. 21, the clearance is formed more easily between the peripheral portions of the insert and the mold, facilitating formation of the embracing projections 54' to join the insert to the foamed resin molding in a secure manner.

Example 7:

Example 6 is repeated except that an insert of a different shape is employed.

As seen in FIG. 22 which illustrates the molding stage, the insert 60 is provided with a plural number of through holes 61 and the thermoplastic urethane film is expanded and forced into these holes 61 by the resin foaming. The thermoplastic urethane film which has entered the holes 61 through the respective openings is expanded further between the cavity wall of the upper mold 62 and the insert 60, forming locking projections 64 together with the foamed resin body 63. These locking projections 64 which are protruded from the foamed resin body 63 are covered with the skin layer 65 and bulged substantially in T-shape on the outer side of the through holes 61. Thus, the insert 60 is mechanically joined to the foamed resin body 63 by these locking projections 64.

This Example has the same operational effects as Example 6.

Although the insert is provided with through holes of a constant diameter in this Example, there may be employed an insert with through holes 66 of a tapered shape as shown in FIG. 23. Similar effects can be obtained by providing, instead of the through holes, grooves 67, 68 as shown in FIGS. 24 and 25 or a hollow member 69 as shown in FIG. 26.

Example 8:

Example 1 is repeated except that a bag-like cover member 70 of woven cloth which has been sewn into a predetermined shape beforehand is placed in a mold 71 as shown in FIG. 27.

As shown in FIG. 28, the obtained molding exhibits no leakage of foamed polyurethane resin through the cover member 70 and has a uniform hardness as a whole with no stiffening of seam portions. The cover member 70 is densely packed without slack or wrinkles.

Example 9

A sheet of material laminated with woven cloth 81 and slab foam 82 is cut to a predetermined shape, sewn at marginal portions thereof with wrong side out, and reversed to form a bag-shaped cover member 8. A bag-shaped expansible film 83 is inserted from resin charging port 80, and air in bag-shaped expansible film 83 is extracted. Foamable resin 85 is charged into bag-shaped expansible film 83 through a nozzle 84 as shown in FIG. 29. The bag-shaped expansible film 83 is expanded by the foaming pressure of foamable resin 85, as shown in FIG. 30 and the bag-shaped cover member 8 is pressed outwardly on its inner surface by the foaming pressure of the foamable resin 85 in the bag-shaped expansible film 83, as shown in FIG. 31. Thus, a molding having no wrinkles and superior resiliency obtained.

Having now fully described the invention, it will be apparent to one of ordinary skill in the art that many changes and modifications can be made thereto without departing from the spirit or scope of the invention as set forth herein.

What is claimed is:

1. A method for producing a foamed resin molding, comprising the steps of:
   interposing a bag-shaped expansible film in a cavity of a mold with an opening in alignment with a parting line of said mold;
   interposing an insert in said bag-shaped expansible film;
   extracting air from said bag shaped film to conform the film to the shape of the insert prior to charging with a foamable resin;
   charging a foamable resin into said bag-shaped expansible film from said opening;
   molding a foamed resin body by foaming said foamable resin while concurrently shaping said bag-shaped expansible film by expanding same by pressure generated by said foaming against and into conformity with the shape of said mold cavity, thereby connecting said insert integrally with the foamed resin body; and ejecting said foamed resin body covered with a skin layer of the expanded said bag-shaped expansible film and containing said insert as a core from said mold.

2. The method of claim 1, wherein said foamable resin is charged into said bag-shaped expansible film through an opening thereof after placing said bag-shaped expansible film in said mold cavity with said opening in alignment with a resin charging port of said mold.

3. The method of claim 1, wherein said bag-shaped expansible film is constituted by a pair of expansible films with marginal edge portions thereof fixedly gripped by clamping said mold.

4. The method of claim 1, wherein said foamable resin is foamed after placing in said mold cavity said bag-shaped expansible film charged with said foamable resin.

5. The method of claim 1, further comprising the steps of:
applying adhesive to at least one part of the surface of said skin layer after ejection of said foamed resin body; and
depositing pile fibers on the adhesive-applied surface of said skin layer to form a piled portion thereon.

6. The method of claim 1, further comprising the step of coating with paint at least one part of the surface of said skin layer to form a coating layer thereon after said step of ejecting said foamed resin body.

7. The method of claim 1, further comprising the step of degassing said foamed resin body after said step of foaming said foamable resin.

8. A method for producing a foamed resin molding, comprising the steps of:
placing a bag-shaped expansible film in a bag-shaped cover member, wherein the bag-shaped cover member resists deforming force of foaming pressure sufficiently to resist deformation;
foaming a foamable resin in said bag-shaped expansible film, while concurrently shaping said bag-shaped expansible film by expanding same against and into conformity with the shaped cover member using pressure generated by foaming the resin.

9. The method of claim 8, wherein said bag-shaped cover member is placed in the cavity of a mold and formed into a predetermined shape by being pressed against the cavity walls of said mold by expansion of said bag-shaped expansible film.

10. A method of claim 9, further comprising:
interposing an insert in said bag-shaped expansible film before the foaming step, whereby during the foaming step said insert is integrally connected to the foamed resin body as a core thereof.

11. The method of claim 8, further comprising the step of extracting air from said bag-shaped expansible film before said step of foaming said foamable resin.

12. The method of claim 8, further comprising the step of degassing said foamed resin body after said step of foaming said foamable resin.

* * * * *